United States Patent
Santos et al.

(10) Patent No.: US 9,794,171 B2
(45) Date of Patent: Oct. 17, 2017

(54) MODIFICATION OR ADDITION TO FORWARDING TABLE BASED ON ADDRESS

(75) Inventors: Jose Renato G Santos, Morgan Hill, CA (US); Michael Schlansker, Los Altos, CA (US); Jean Tourrilhes, Mountain View, CA (US)

(73) Assignee: Hewlett Packard Enterprise Department LP, Houston, TX (US)

( * ) Notice: Subject to any disclaimer, the term of this patent is extended or adjusted under 35 U.S.C. 154(b) by 1081 days.

(21) Appl. No.: 13/599,803

(22) Filed: Aug. 30, 2012

(65) Prior Publication Data

US 2014/0064278 A1    Mar. 6, 2014

(51) Int. Cl.
*H04L 12/741*    (2013.01)

(52) U.S. Cl.
CPC ................................... *H04L 45/54* (2013.01)

(58) Field of Classification Search
CPC .................................................... H04L 45/745
USPC .......... 370/338, 351, 389, 392, 395.31, 401; 709/238, 242; 340/8.1, 9.14, 9.15
See application file for complete search history.

(56) References Cited

U.S. PATENT DOCUMENTS

| | | | |
|---|---|---|---|
| 6,735,198 B1 * | 5/2004 | Edsall et al. | 370/389 |
| 7,643,424 B2 | 1/2010 | Liu et al. | |
| 8,788,823 B1 * | 7/2014 | Huang et al. | 713/170 |
| 2005/0141517 A1 * | 6/2005 | Choi et al. | 370/395.31 |
| 2008/0002625 A1 | 1/2008 | Cho et al. | |
| 2011/0317703 A1 | 12/2011 | Dunbar et al. | |

OTHER PUBLICATIONS

Diallo, T., Provider Backbone Bridge with Traffic Engineering a Carrier Ethernet Technology Overview, (Web Page).

Sun, X., Design of Scalable and Efficient Information Retrieval Systems, (Research Paper), The Hong Kong Polytechnic University, Jun. 2011.

Sun, X. et al., An Effective Caching on Forwarding Table Scheme for Metro Ethernet, (Research Paper), International Journal of Advanced Science and Technology, Oct. 2010.

* cited by examiner

*Primary Examiner* — Christopher Grey
(74) *Attorney, Agent, or Firm* — Hewlett Packard Enterprise Patent Department

(57) ABSTRACT

Embodiments herein relate to addition or modification to a forwarding table based on an address. A first packet having a source address and a location value may be received. The source address includes a source of the first packet and the location value indicates at least part of a route along a network to the source address. The forwarding table is not modified or no new entry is added to the forwarding table, if the forwarding table does not include the source address.

17 Claims, 6 Drawing Sheets

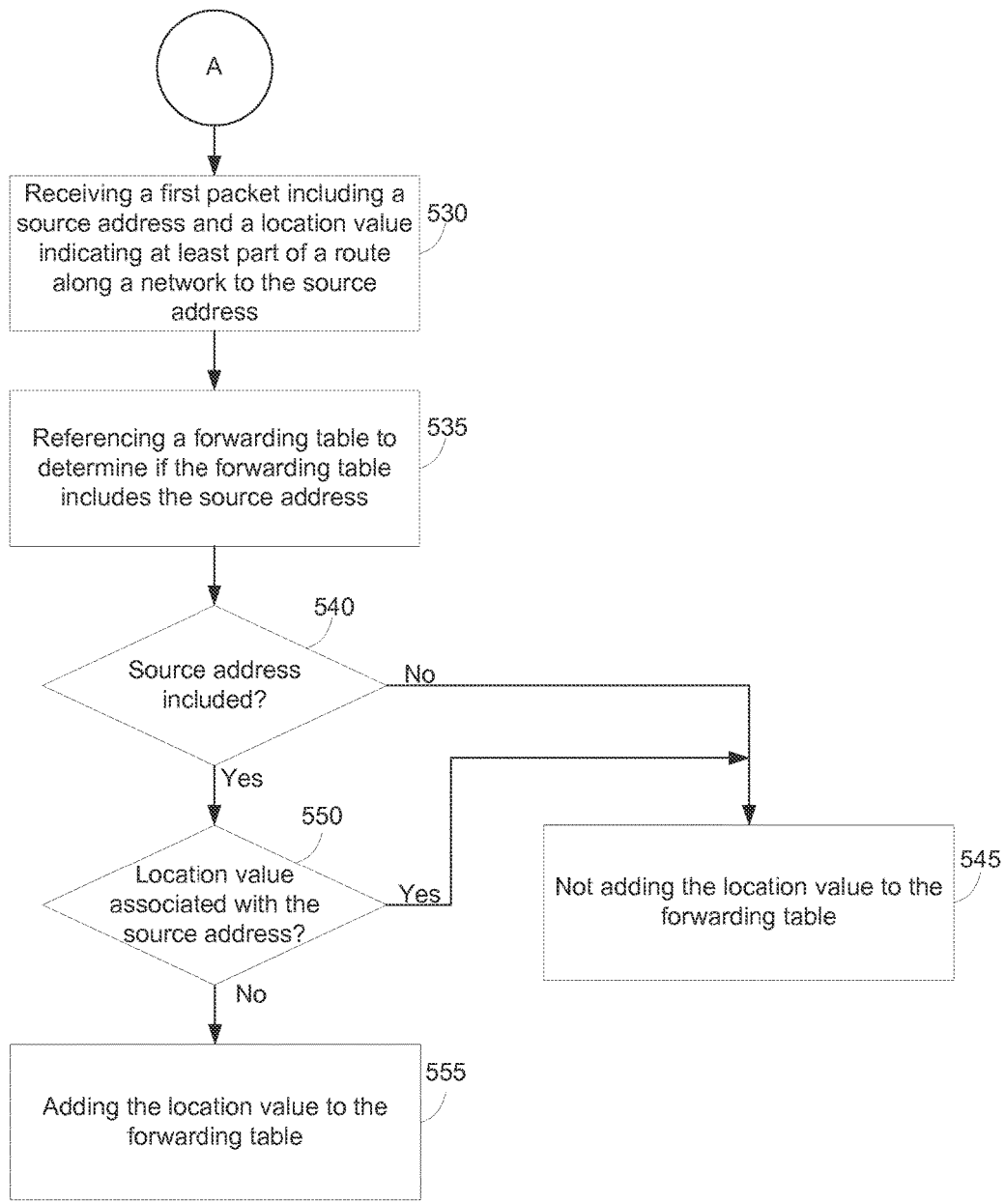

MODIFICATION OR ADDITION TO FORWARDING TABLE BASED ON ADDRESS

BACKGROUND

Networks may employ packet-forwarding devices, such as network switches. Network switches may include forwarding tables that indicate where to forward a packet for a given destination address. Forwarding tables do not initially know where to forward a packet for the given destination address.

Instead, forwarding tables learn over time where to forward a packet for the given destination address. Manufacturers and designers are challenged to provide more efficient forwarding tables in order to reduce forwarding table size and hardware costs.

BRIEF DESCRIPTION OF THE DRAWINGS

The following detailed description references the drawings, wherein:

FIGS. 5A and 5B are another example flowchart of a method for adding a location value to a forwarding table based on an address.

DETAILED DESCRIPTION

Figure 1:
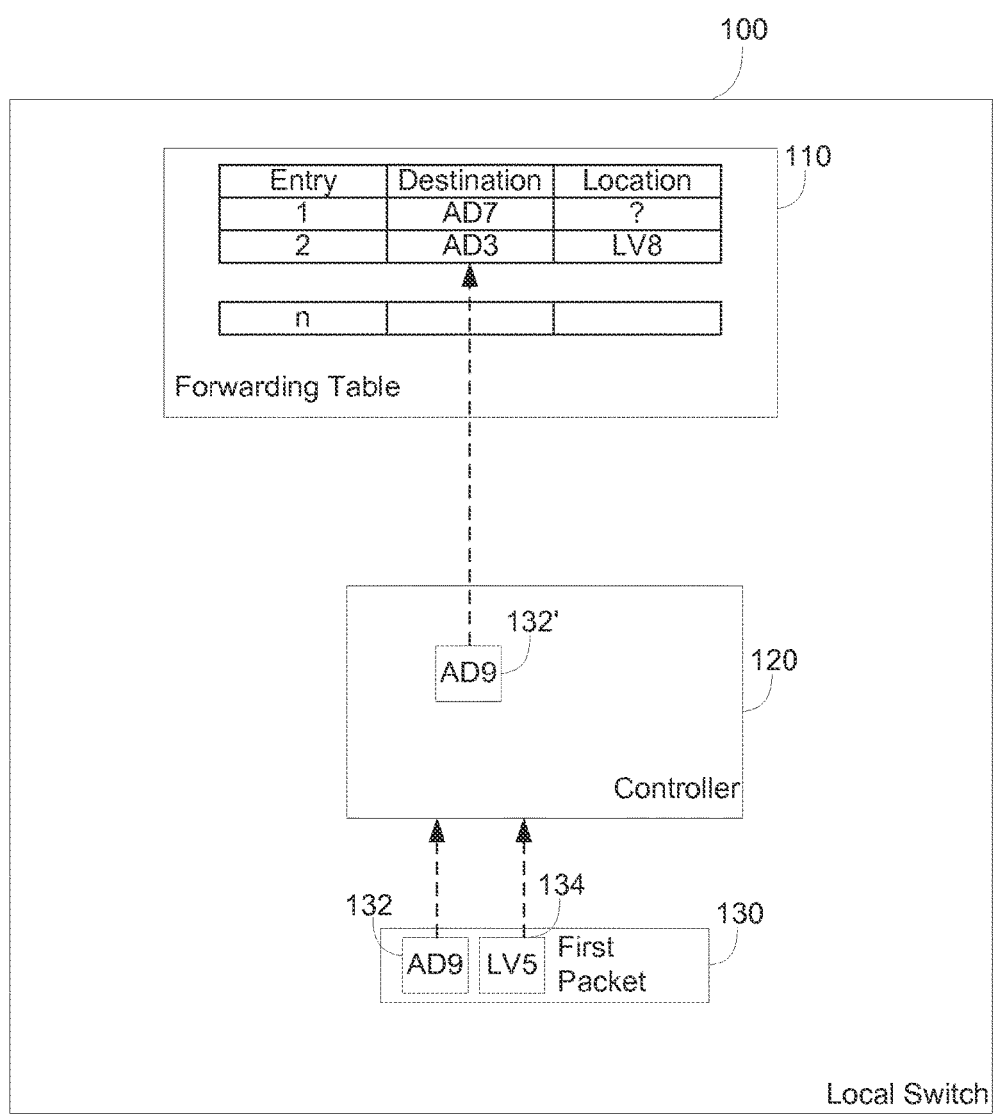
FIG. 1 is an example block diagram of a local switch including a forwarding table.

Specific details are given in the following description to provide a thorough understanding of embodiments. However, it will be understood by one of ordinary skill in the art that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Packet-forwarding devices, such as network switches, employ forwarding tables. These forwarding tables may indicate a route or location value, such as a port number or MAC address, for a destination address of a packet. The destination address of the packet may indicate a remote device, such as a client or tenant device. Further, the destination address may include, for example, an Ethernet MAC address and/or a client or tenant ID to distinguish between MAC addresses of different clients.

The forwarding table may initially be empty but soon become populated through a learning process. For example, the forwarding table may learn the mapping of a destination address to a location value when a local switch receives a first packet. The location value may be, for example, a MAC address of a remote switch stored in the first packet or a port number on which the first packet was received. The local switch may add any mapping as an entry to the forwarding table which the forwarding table has not yet learned. Then, the network switch may be able to correctly forward a received second packet to its destination address, assuming there is a mapping for that destination address in its forwarding table.

When a network switch, such as the local or remote switch, does not have a mapping in its forwarding table for a destination address of the second packet to be transmitted, the switch may broadcast the packet, such as on a backbone network and also to local ports. The packet may also optionally be broadcast across the network or part of the network, such as a particular VLAN. Thus, the broadcast packet may be received by multiple switches or devices, regardless if that packet is destined for that switch or devices.

As explained above, when a switch receives a packet having a location value for which it does not have a mapping, the switch will add a mapping to its forwarding table. This mapping will associate that location value with the source address of the first packet, which is referred to as a destination address in the switch's forwarding table. However, adding this mapping may be undesirable if the switch is not going to send any packets to that destination address. For example, the switch may not be coupled to any devices that would send data to that destination address. In this case, an entry in the forwarding table will be consumed by a mapping that will never or rarely be used.

Consuming entries of the forwarding table with unused or rarely used mappings may be disadvantageous because space or storage capacity in the forwarding table is limited. Thus, adding a new entry may require evicting an old entry which might be needed in the future. Adding unnecessary or unused mappings to the forwarding table may be referred to as polluting the learning table. This pollution is more likely for large networks that have a large number of devices and/or switches, and in particular when the devices transmitting the packets are coupled to only a small fraction of the switches. In this situation, a large number of switches that do not have the need for a mapping to a particular remote device will have their forwarding table polluted when there is a broadcast associated with that particular remote device. Further, a large number of devices are likely to pollute many switches with many addresses.

Embodiments herein relate to a learning mechanism that reduces or eliminates pollution of forwarding tables. For example, a controller may receive a first packet having a source address and a location value. The source address includes a source of the first packet and the location value indicates at least part of a route along a network to the source address. A forwarding table includes a plurality of entries, each entry including a destination field and a location field. The controller may compare the source address of the first packet to values of the destination fields of the forwarding table. The controller may not add a new entry including the location value of the first packet to the forwarding table, if none of the destination fields of the plurality of entries of the forwarding table include the source address of the first packet.

Further, an entry may only added to the forwarding table when a local device sends a second packet to a remote device and a destination address of the second packet is not found in the forwarding table. This may ensure that the forwarding table only has entries of destination addresses for remote devices with which the local switch needs to or has recently communicated. However, when an entry is added in this way, the mapping to the corresponding remote device may not initially be known, where the entry is added with an unknown location value. As soon as a first packet is received from the remote device, the learning mechanism may update the unknown location value, such was with a corresponding MAC address received in the first packet or a port number through which the first packet was received.

Also, if the remote device migrates, such as to a new remote switch, any entry associated with that remote device may be updated with the correct mapping as soon as a first packet is sent by the remote device from its new location. However, other switches that are not communicating with that remote device will not have their forwarding tables polluted, unlike traditional learning mechanisms. Thus, embodiments may reduce or eliminate pollution of forwarding tables, especially in networks where a number of possible mappings greatly exceeds a capacity of the forwarding table.

Referring now to the drawings, FIG. 1 is an example block diagram of a local switch 100 including a forwarding table 110. The local switch 100 may be, for example, any type of network switch, including a router, a hub, a gateway, a bridge, a Provider Backbone Bridging (PBB) edge switch or any other type of device capable of receiving and transmitting packets of data. PBB may refer to a set of architecture and protocols for routing over a provider's network allowing interconnection of multiple Provider Bridge Networks without losing each customer's individually defined VLANs. The local switch 100 includes the forwarding table 110 and a controller 120.

The forwarding table 110 may be implemented within a machine-readable storage medium such as any electronic, magnetic, optical, or other physical storage device that contains or stores data, such as addresses. Thus, the forwarding table 110 may be included within, for example, Ternary Content Addressable Memory (TCAM), Random Access Memory (RAM), an Electrically Erasable Programmable Read-Only Memory (EEPROM), a storage drive, and the like.

The forwarding table 110 may be optimized for fast lookup of location values, such as port numbers or MAC or IP addresses, associated with destination addresses to which to output packets. For example, the MAC or IP address may respectively be an encapsulated MAC (such as via PBB) or IP (such as via VXLAN or NVGRE) address of a switch that links to a MAC or IP address of device coupled to that switch. The forwarding table 110 may also be optimized for efficient updating by routing protocols and other control plane methods.

The controller 120 may include, for example, a hardware device including electronic circuitry for implementing the functionality described below, such as control logic and/or memory. In addition or as an alternative, the controller 120 may be implemented as a series of instructions encoded on a machine-readable storage medium and executable by a processor. Further, the controller 120 may include mechanical, electrical and/or logical signals and a protocol for sequencing the signals.

The controller 120 is to receive a first packet 130 having a source address 132 and a location value 134. The source address 132 includes a source of the first packet 130, such as a remote device (not shown), and the location value 134 indicates at least part of a route along a network to the source address 132, such as a Media Access Control (MAC) or IP address. The controller 120 may read at least the source address 132' from the first packet 130. Further, the controller 120 may compare the source address 132' of the first packet 130 to values of the destination fields at the forwarding table 110.

The forwarding table 110 includes a plurality of entries 1 to n, where n is a natural number. Each of the entries 1 to n includes a destination field and a location field. The terms "AD3", "AD7" and AD9 shown in FIG. 1 are provided as different example address values and may represent any type of address, such as a MAC address. Similarly, the terms "LV5" are "LV8" shown in FIG. 1 are provided as different example location values, and may represent any type information used to indicate at least part of the route along a network to it associated source address, such as a port number or MAC or IP address. The symbol "?" in the forwarding table 110 may indicate that a value thereof is unknown.

In FIG. 1, the forwarding table 110 is shown to include values "AD3" and "AD7" in the destination fields of its first and second entries 1 and 2. However, the forwarding table 110 is not shown to include the value "AD9" in any of its destination fields, which is the value of the source address 132' found in the first packet 130. As none of the destination fields of the plurality of entries 1 to n of the forwarding table 110 includes the source address 132' of the first packet 130, the controller 120 does not add a new entry including the source address 132 or the location value 134 of the first packet 130 to the forwarding table 110. For example, the controller 120 does not add an entry where the destination field includes the source address 132 of the first packet 130 and the location field includes location value 134 of the first packet 130.

Instead, the controller 120 may simply forward or discard the first packet 130. By not modifying the forwarding table 110, embodiments may prevent or reduce unnecessarily pollution of the forwarding table 110. This is because the forwarding table 110 may have a limited size and adding unknown entries to the forwarding table for a destination to which the local switch 100 has not sent packets may cause known entries to be deleted for destinations to which the local switch 100 actually has sent or will send packets. Deleting a known entry can be detrimental because there may be a greater likelihood of sending packets to a destination to which packets were previously sent. Without the known entry, the local switch 100 may waste additional time trying to relearn the associated location value if packets are attempted to be sent to that destination. On the other hand, there is a much lower likelihood of sending packets to a destination to which packets have not been previously sent. Thus, embodiments may avoid or reduce delays and inefficiencies in packet transmission caused by adding an entry to the forwarding table 120 of the local switch 100 which is unlikely to be used in the future.

Figure 2:
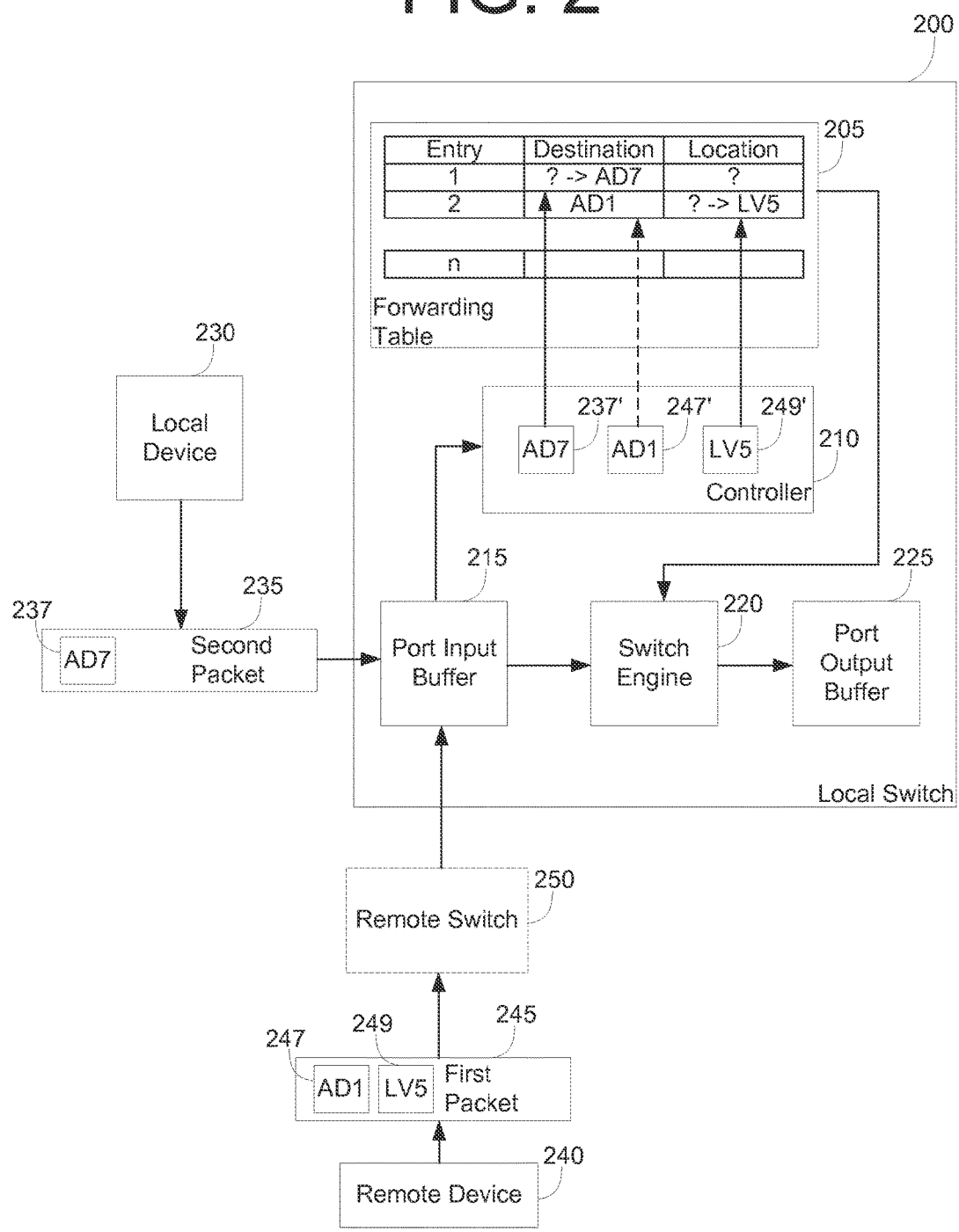
FIG. 2 is another example block diagram of a local switch including a forwarding table.

FIG. 2 is another example block diagram of a local switch 200 including a forwarding table 205. The local switch 200 may be, for example, any type of network switch, including a router, a hub, a gateway, a bridge, a PBB edge switch or any other type of device capable of receiving and transmitting packets of data. The local switch 200 includes the forwarding table 205, a controller 210, a port input buffer 215, a switch engine 220 and a port output buffer 225. The forwarding table 205 and the controller 210 of FIG. 2 may respectively include the functionality and/or hardware of the forwarding table 110 and the controller 210 of FIG. 1.

As shown in FIG. 2, the first packet 245 may be output from a remote device 240 to the local switch 200. The local switch 200 may also receive a second packet 235 from a local device 230. The local switch 200 is associated with and/or coupled to the local device 230. The remote device 240 may directly send the first packet 245 to the local switch 200 or alternatively, communicate with the local switch 200 via a remote switch 250. For example, the remote device 240 may be associated with and/or coupled to the remote switch 250, with the remote switch 250 having at least some of the functionality of the local switch 200. In the case that the remote switch 250 is employed, the first packet 245 may include an encapsulated MAC or IP address of the remote switch 250, while the second packet 235 may not include any such type of encapsulated MAC or IP address. However, both the first and second packets 235 and 245 may still include source and destination MAC addresses which represent IDs of the source and destination devices, such as the local and remote devices 230 and 240.

Thus, in one embodiment, the local device 230 may transmit the second packet 235 to the remote switch 250 via the local switch 200 and the remote device 240 may transmit the first packet 245 to the local switch 200 via the remote switch 250. The local and remote devices 230 and 240 may be any type of computing device capable of interfacing with a network and transmitting a packet across a network, such as a network host. The network host may offer information resources, services, and applications to users or other nodes on the network. Any of the local switch 200, the remote switch 250, the local device 230, and the remote device 240 may have separate addresses, such as separate MAC addresses.

While FIG. 2 shows a single local device 230, a single remote device 240, a single second packet 235 and a single first packet 245, embodiments may include a plurality of local and remote devices 230 and 240 transmitting a plurality of local and first packets 235 and 245 to the local switch 200. Further, where one or more of the local and remote devices 230 and 240 are part of a same tenant or client (tenant device), a PBB network protocol may be used for MAC-in-MAC encapsulation to transport network packets from multiple tenants/clients across a backbone network of Ethernet switches. PBB may provide logical isolation for tenant networks preventing traffic from one tenant device to be delivered to devices of other tenants. Alternatively, IP encapsulation mechanisms such as VXLAN or NVGRE may be used to provide logical isolation for tenant networks. VXLAN and NVGRE may be examples for providing a capability to create isolated, multi-tenant broadcast domains across data center fabrics and enabling customers to create elastic, logical networks that span physical network boundaries.

The remote or local devices 230 or 240 of the client/tenant may access the backbone through local or remote switches 200 or 250, which may have unique L2 Ethernet addresses. For example, the local switch 200 may encapsulate the second packets 235 received from the local devices 230 coupled thereto and decapsulate the first packets 245 before delivering them to the local devices 230. The forwarding table 205 may include MAC addresses of remote switches 250 for the location field, when MAC-in-MAC encapsulation is employed or the IP address of remote switches 250 when IP encapsulation is employed. Otherwise or additionally, the forwarding table 205 may include port numbers for the location field.

As explained above, new entries may not be added to the forwarding table if the source address of the first or second packets 235 or 245 is not present in the forwarding table 205. However, a new entry may be added to forwarding table 205 if the destination address of the first or second packets 235 or 245 is not present in the forwarding table 205. For example, the controller 210 may receive the second packet 235 including a destination address 237. In this case, the controller 210 may add a new entry to the forwarding table 205 if the destination address 237 of the second packet 235 is not already included in any of the destination fields of the forwarding table 205. Where the destination address 237' is not found in the forwarding table 205, the destination field of the new entry may include the destination address 237' of the second packet 235 and the location field of the new entry may remain unknown because the local switch 200 does not yet know the location value for the destination address 237'.

For instance, as shown in FIG. 2, the destination address 237 of the second packet 235 has a value of "AD7," but the forwarding table 205 does not have the value "AD7" for the destination field of any of the entries 1 to n. Therefore, the controller 210 fills in a new entry, such as the first entry 1, by adding the value "AD7" for the destination field of the first entry. However, the location field of the first entry 1 remains unknown as the local switch 200 has not yet learned a forwarding route thereto. The forwarding route for the destination address "AD7" could be learned, for example, if a packet from the address "AD7" is received by the local switch 200. While FIG. 2 shows the new entry being created at the first entry 1, embodiments are not limited thereto. For example, the new entry can be created at any entry of the forwarding table 205, including a filled entry, such as when the forwarding table 205 is full. Moreover, the term "first entry" may be used refer to any one of the entries 1 to n in the forwarding table 205.

Thus, the controller 210 is to add the new entry to the forwarding table 205 only based on a packet being received by the local switch 200 with a new destination address, and not based on a new source address. For example, if the destination address 237 of the second packet 235 is already included in the destination field of one the entries 1 to n of the forwarding table 205, then the controller 210 will not add a new entry.

In one embodiment, the location field may indicate the MAC or IP address of the remote switch 250. In another embodiment, the location field may indicate a port number of the local switch 200. For example, if the remote device 240 sends the first packet 245 to the local switch 200 without the remote switch 250 and/or without MAC-in-MAC encapsulation, the forwarding table 205 may track on which port of the local switch 200 the first packet 245 is received for a given source address 247 of the first packet 245. On the other hand, if the remote device 240 sends the first packet 245 via the remote switch 250 and/or with MAC or IP encapsulation, such as through PBB or VXLAN, the forwarding table 205 may track the MAC or IP address of the remote switch 250 included in the first packet 245 for a given source address 247 of the first packet 245.

In the embodiment where the location value of the first packet 245 relates to a MAC or IP address of the remote switch 250, the destination address 237 of the second packet 235 and the source address 247 of the first packet 245 may relate to a location of the remote device 240. Further, the location of the remote device 240 may include a tenant identification (ID) (not shown) in addition to the MAC address of the remote device 240. Moreover, the location of the remote device 240 may include a virtual LAN (VLAN) ID (not shown) if the network employs a plurality of VLANs. The tenant and/or VLAN ID may be used to differentiate between two remote devices having the same MAC address but belonging to different VLANs and/or tenants.

The controller 210 is to add a value to the location field of an entry of the plurality of entries 1 to n based on the location value 249 of the first packet 245, if the source address 247 of the first packet 245 matches a value of the destination field of the entry and the value at the location field of the entry does not match the location value 249 of the first packet 245. For example, in FIG. 2, the controller 210 reads the value of the source address 247' of the first packet 245, which has a value of "AD1." Next, the controller 210 matches this value with the destination field of the second entry 2 of the forwarding table 205, which also has a value of "AD1." Then, the controller 210 reads the location value 249' of the first packet 245 to determine if it matches the value at the location field of the second entry 2. As the location value 249' of the first packet 245 is "LV5" and the value at the location field of the second entry is unknown or "?," these values do not match.

Thus the controller 210 may update the forwarding table 205 by replacing the unknown value with "LV5" for the location field of the second entry 2. As noted above, in one embodiment, the location field value, such as "LV5," may indicate the MAC or IP address of the remote switch 250. In another embodiment, the location field value, such as "LV5," may indicate the port number of the local switch 200 at which the first packet 245 was received.

Whereas the local switch 200 may not have previously known where to forward a packet destined for the address "AD1," the local switch 200 has now learned to forward such a packet to the location value "LV5." For example, the controller 210 may output the second packet 235 to one of a plurality of ports (not shown) of the local switch 200, if one of the plurality of entries 1 to n of the forwarding table 205 includes a destination field having the destination address 237 of the second packet 235 and a location field having a port number that matches one of the plurality of ports of the local switch 200. Similarly, the network controller 210 may output the second packet 235 to the remote switch 250, if one of the plurality of entries 1 to n of the forwarding table 205 includes a destination field having the destination address 237 of the second packet 235 and the location field having the MAC address that matches the remote switch 250.

The forwarding table 205 may also include a timeout field (not shown) for each of the entries 1 to n. A value of the timeout field may represent an amount of time an associated entry is to remain in the forwarding table 205 without being accessed. For example, if no packet is sent to a destination address of an entry within a time value of the timeout field, this entry may be discarded from the forwarding table 205. In the embodiment where the location field stores port numbers, the first and second packets 235 and 245 may be indistinguishable to the local switch 200, as the local switch 200 only tracks on which ports the first and second packets 235 and 245 are received.

In this case, the controller 210 may add new entries to the forwarding table 205 for any packet, such as the first or second packets 235 and 245, which includes a destination address not found in the destination field of any of the entries 1 to n of the forwarding table 205. These new entries will generally have an unknown value for the location field. In an embodiment, the controller 210 may set a value of the timeout field for such new entries to be different than that of existing entries. For example, the controller 210 may set the timeout field to have a lower value for the new entry than that of the existing entry, such as 1 second (s) instead of 10 s. Thus, pollution of the forwarding table 205 may be reduced or minimized from destinations to which the local switch 200 never or rarely sends packets, because entries from these rarely or never sent to destination addresses will have a shorter lifespan in the forwarding table 205.

The second packet 235 and/or the first packet 245 may be output from the local switch 200 via the switch engine 220. The switch engine 220 may include a processor, such as a central processing unit (CPU), a semiconductor-based microprocessor, a graphics processing unit (GPU), a switch ASIC, and other hardware devices suitable for forwarding and/or routing packets. For example, the switch engine 220 may look up the forwarding table 205 using the destination address 237 of the second packet 235 to determine where to forward the second packet 235.

The port input and port output buffers 215 and 225 may be any type of physical storage media, such as RAM, used to temporarily hold data while it is being moved from one place to another. For example, the port input buffer 215 may store incoming packets, such as local or first packets 235 and 245, received at one or more input ports (not shown) of the local switch 200. The port output buffer 225 may store outgoing packets, such as packets output by the switch engine 220, to be output from one or more output ports (not shown) of the local switch 200.

Figure 3:
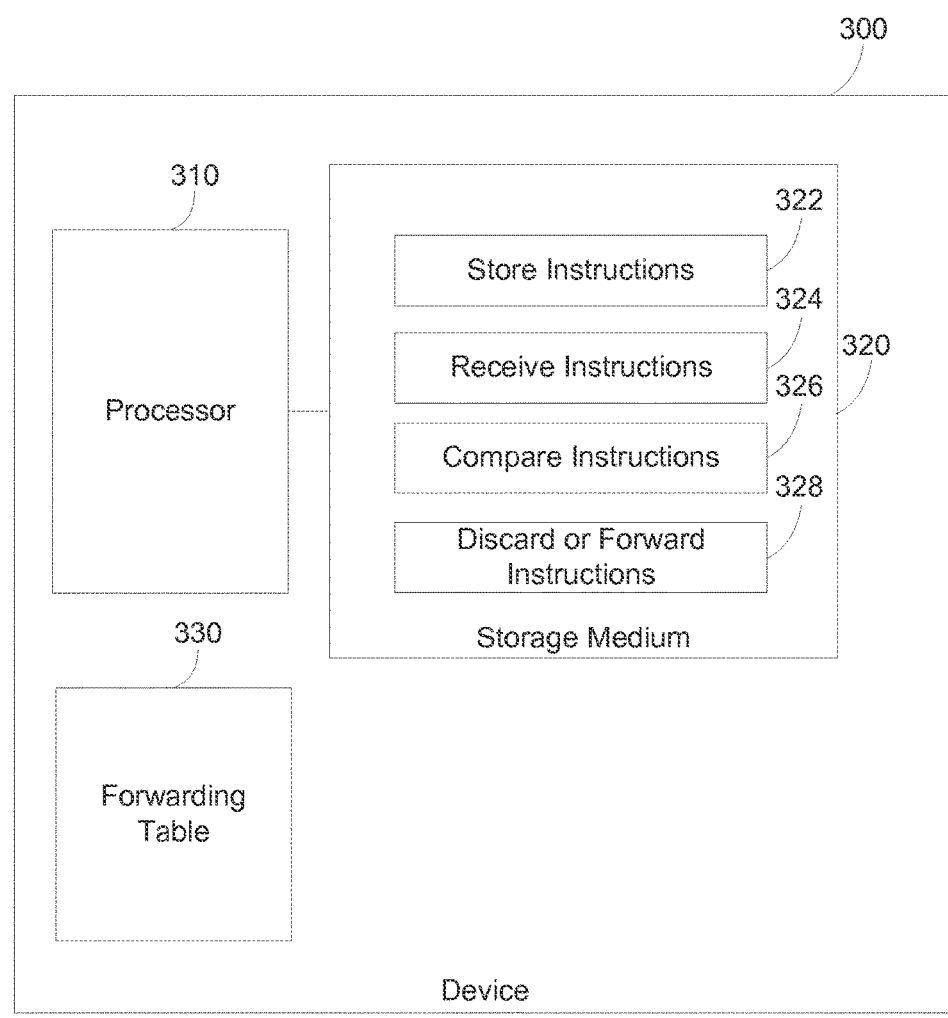
FIG. 3 is an example block diagram of a computing device including instructions for modifying a forwarding table based on an address.

FIG. 3 is an example block diagram of a computing device 300 including instructions for modifying a forwarding table based on an address. In the embodiment of FIG. 3, the computing device 300 includes a processor 310, a machine-readable storage medium 320 and a forwarding table 330. The forwarding table 330 of FIG. 3 may be similar to the forwarding table 205 of FIG. 2. The machine-readable storage medium 320 further includes instructions 322, 324, 326 and 328 for modifying the forwarding table 330 based on an address. The computing device 300 may be, for example, any type of network switch, including a router, a gateway, a bridge or any other type of device capable of executing the instructions 322, 324, 326 and 328. In certain examples, the computing device 300 may be included or be connected to additional components such as a storage drive, a server, a network appliance, etc.

The processor 310 may be, for example, at least one central processing unit (CPU), at least one semiconductor-based microprocessor, at least one graphics processing unit (GPU), other hardware devices suitable for retrieval and execution of instructions stored in the machine-readable storage medium 320, or combinations thereof. The processor 310 may fetch, decode, and execute instructions 322, 324, 326 and 328 to implement modifying the forwarding table 330 based on an address. As an alternative or in addition to retrieving and executing instructions, the processor 310 may include at least one integrated circuit (IC), other control logic, other electronic circuits, or combinations thereof that include a number of electronic components for performing the functionality of instructions 322, 324, 326 and 328.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for modifying the forwarding table 330 based on an address.

Figure 4:
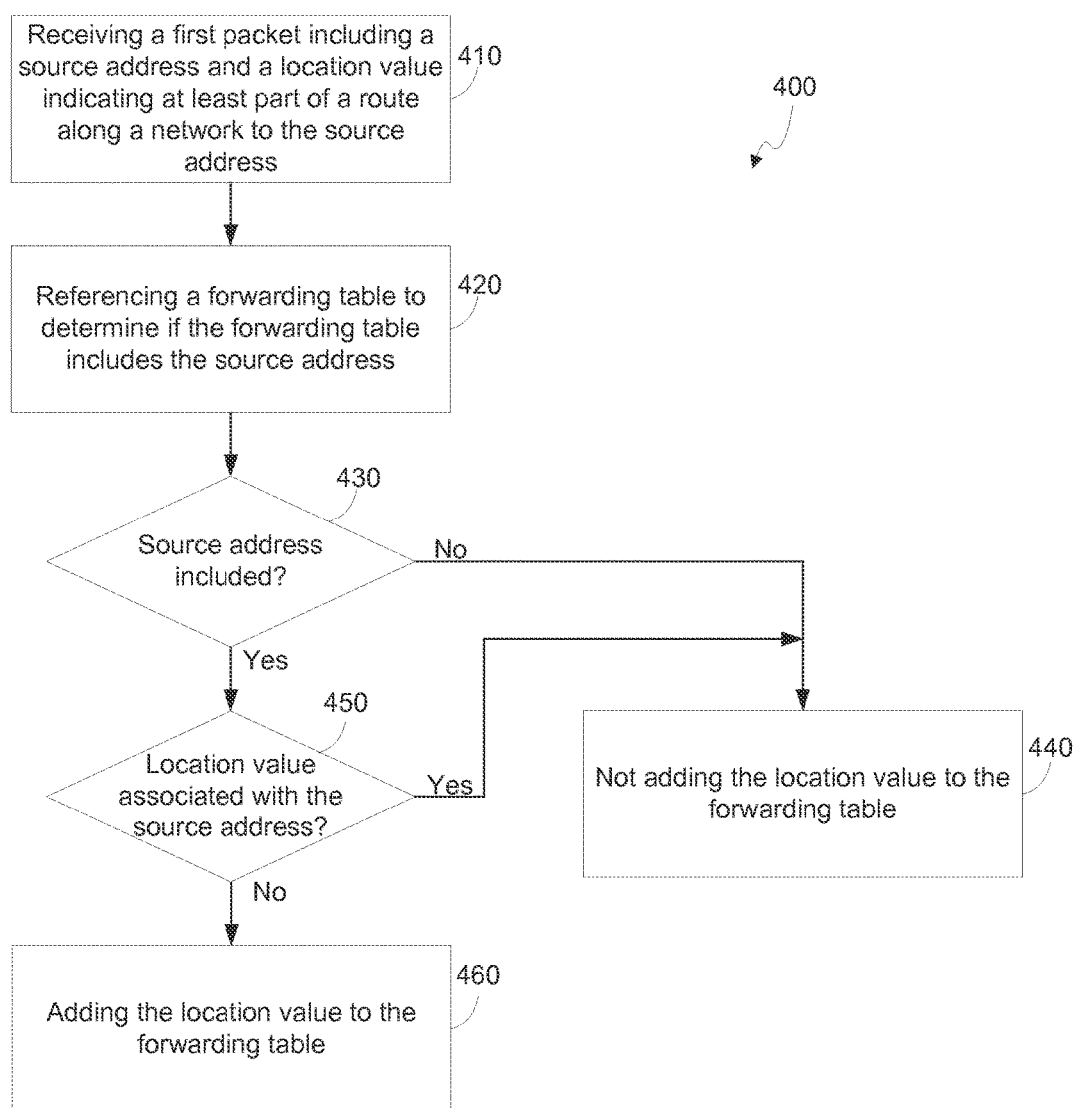
FIG. 4 is an example flowchart of a method for adding a location value to a forwarding table based on an address.

Moreover, the instructions 322, 324, 326 and 328 when executed by a processor (e.g., via one processing element or multiple processing elements of the processor) can cause the processor to perform processes, such as, the process of FIG. 4. For example, the store instructions 322 may be executed by the processor 310 to store, at the forwarding table 330, destination addresses of a plurality of remote devices (not shown). The destination addresses are extracted from second packets (not shown) received from one or more local devices (not shown) coupled to the device 300. A new destination field is added to the forwarding table 330 only if the destination address of the second packet is not included in any of the existing destination fields of the forwarding table 330.

The receive instructions 324 may be executed by the processor 310 to receive a first packet from one of the plurality of remote devices. The first packet is to include a source address and a location value indicating at least part of a route along a network to the source address. The compare instructions 326 may be executed by the processor 310 to compare the source address of the first packet to the destination addresses of the forwarding table 330.

The discard and forward instructions 324 may be executed by the processor 310 to at least one of discard and forward the first packet without modifying the forwarding table, if none of destination addresses of the forwarding table 330 match the source address. Further, the storage medium 320 may include instructions not shown, such as to add the location value of the first packet to the forwarding table 330 if one of the destination addresses matches the source address and the matching destination address is not yet associated with the location value.

FIG. 4 is an example flowchart of a method 400 for adding a location value to a forwarding table based on an address. Although execution of the method 400 is described below with reference to the local switch 100, other suitable components for execution of the method 400 can be utilized, such as the local switch 200. Additionally, the components for executing the method 400 may be spread among multiple devices. The method 400 may be implemented in the form of executable instructions stored on a machine-readable storage medium, such as storage medium 320, and/or in the form of electronic circuitry.

At block 410, the local switch 100 receives a first packet 130, the first packet 130 including a source address 132 and a location value 134 indicating at least part of a route along a network to the source address 132. Then, at block 420, the local switch 100 references its forwarding table 110 to determine if the forwarding table 110 includes the source address 132' and proceeds to block 430. The forwarding table 110 includes a plurality of entries having a destination field and a location field. The referencing at block 420 references the destination field of the plurality of entries for the source address.

If the forwarding table 110 does not include the source address 132', the method 400 flows to block 440 and does not add the location value 134' to the forwarding table 110. If the forwarding table 110 includes the source address 132', the method 400 flows from block 430 to block 450 to determine if the location value 134' is already associated with the source address 132' in the forwarding table 110. If the location value 134' is already associated with the source address 132' in the forwarding table 110, the method 400 flows to block 440 and does not add the location value 134' to the forwarding table 110. Otherwise, if the location value 134' is not yet associated with the source address 132' in the forwarding table 110, the local switch 100 adds the location value 134' to the forwarding table 110, at block 460. The operation at block 460 adds the location value 134' to the location field associated with the destination field including the source address 132' of the forwarding table 110.

Figure 5A:
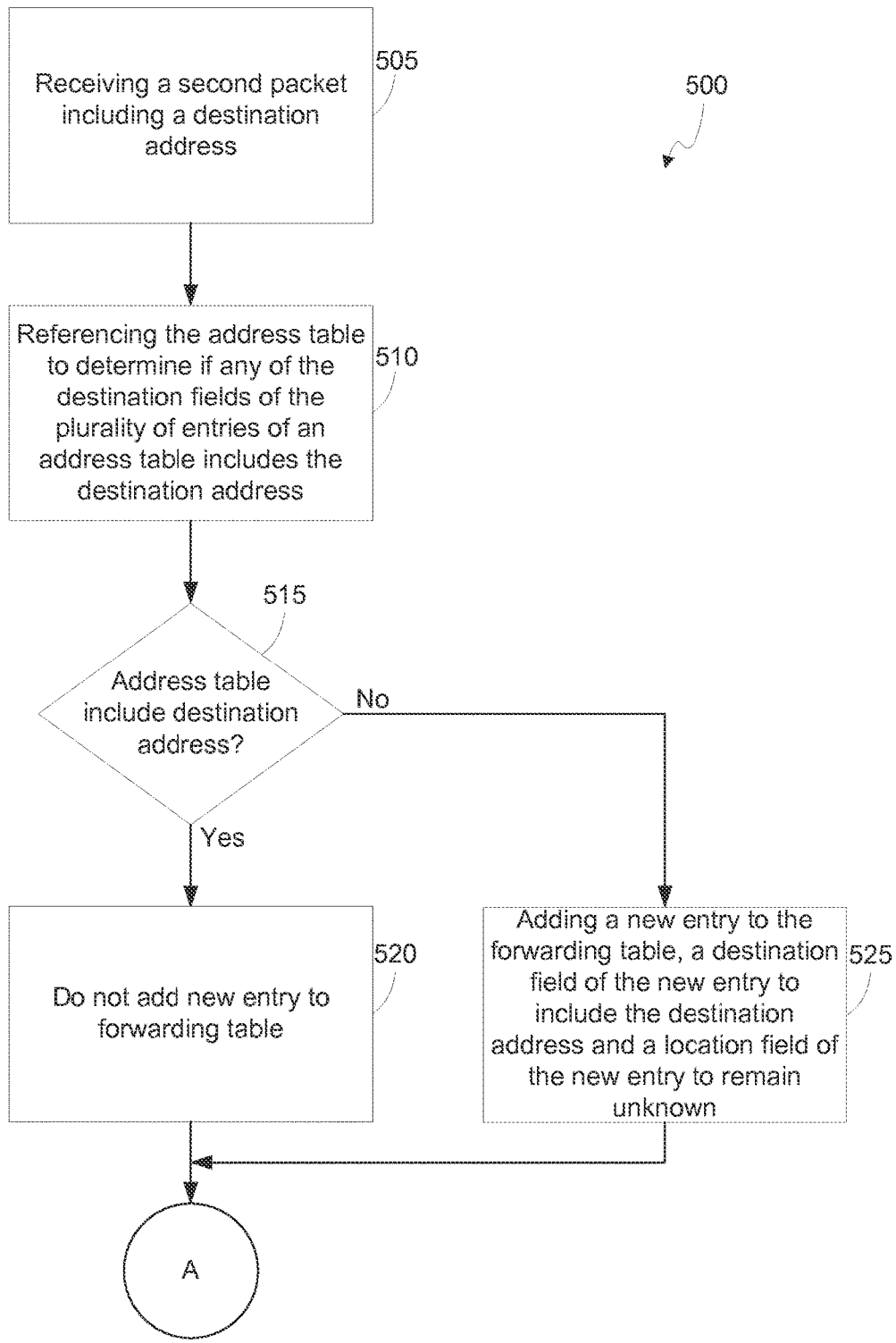

FIGS. 5A and 5B are another example flowchart of a method 500 for adding a location value to a forwarding table based on an address. Although execution of the method 500 is described below with reference to the local switch 200, other suitable components for execution of the method 500 can be utilized, such as the local switch 100. Additionally, the components for executing the method 500 may be spread among multiple devices. The method 500 may be implemented in the form of executable instructions stored on a machine-readable storage medium, such as storage medium 320, and/or in the form of electronic circuitry.

FIG. 5A generally displays a method for adding a new entry to the forwarding table 205. The new entry may include a new destination address not previously found in any of the destination fields of the forwarding table 205 and be based on a destination address found in the second packet 235. At block 505, the local switch 200 receives a second packet 235. The second packet 235 includes a destination address 237 and is received from a local device 230. The forwarding table 205 includes a plurality of entries 1-$n$ having a destination field and a location field. At block 510, the local switch 200 references the forwarding table 205 to determine if any of the destination fields of the plurality of entries of the forwarding table 205 include the destination address 237, and then flows to block 515. Next, the method 500 flows from block 515 to block 520 if any of the destination fields of the plurality of entries of the forwarding table 205 include the destination address 237.

At block 520, the local switch 200 does not add a new entry to the forwarding table 205 because an entry for the destination address 237 already exists. Otherwise, the method 500 flows from block 515 to block 525 if none of the destination fields of the plurality of entries of the forwarding table 205 include the destination address 237. At block 525, the local switch 200 adds a new entry to the plurality of entries 1 to n of the forwarding table 205. The destination field of the new entry is to include the destination address 237 of the second packet and a location field of the new entry is to remain unknown. Thus, new entries may be added to the forwarding table only when a destination address 237 of a second packet 235 to be transmitted, is not found in the forwarding table 205.

FIG. 5B generally shows a method for determining whether to add or alter a location field of an existing entry in the forwarding table 205 based on a location value 249 received from a first packet 245. At block 530, the local switch 200 receives the first packet 245, the first packet 245 including a source address 247 and a location value 249 indicating at least part of a route along a network to the source address 247. The first packet 245 is received from a remote device 240. Then, at block 535, the local switch 200 references its forwarding table 205 to determine if the forwarding table 205 includes the source address 247' and proceeds to block 540. The referencing at block 535 references the destination field of the forwarding table 205 for the source address 247'.

If the forwarding table 205 does not include the source address 247', the method 500 flows to block 545 and does not add the location value 249' to the forwarding table 205. If the forwarding table 205 includes the source address 247', the method 500 flows from block 540 to block 550 to determine if the location value 249' is already associated with the source address 247' in the forwarding table 205. If the location value 249' is already associated with the source address 247' in the forwarding table 205, the method 500 flows to block 545 and does not add the location value 249' to the forwarding table 205. Otherwise, if the location value 249' is not yet associated with the source address 247' in the forwarding table 205, the local switch 200 adds the location value 249' to the forwarding table 205, at block 555. The operation at block 555 adds the location value 249' to the location field associated with the destination field including the source address 247'.

According to the foregoing, embodiments may provide a method and/or device for reducing or eliminating pollution of forwarding tables. By only adding an entry to the forwarding table for a new destination address of a second packet and only modifying the location field of an entry of the forwarding table for an existing destination address that matches the source address of a first packet, unnecessary entries to the forwarding table may be avoided or reduced.

We claim:

1. A local switch, comprising:
a controller to receive a first packet having a source address and a location value, the source address including a source of the first packet and the location value indicating at least part of a route along a network to the source address; and
a forwarding table including a plurality of entries, each entry including a destination field and a location field, wherein
the controller is to compare the source address of the first packet to values of the destination fields of the forwarding table,
the controller is to not add a new entry including the location value of the first packet to the forwarding table if none of the destination fields of the plurality of entries of the forwarding table include the source address of the first packet,
the controller is to receive a second packet including a destination address,
the controller is to add a new entry to the forwarding table if the destination address of the second packet is not included in any of the destination fields of the forwarding table, and
the destination field of the new entry is to include the destination address of the second packet and the location field of the new entry is to remain unknown.

2. The local switch of claim 1, wherein the controller is to add the new entry to the forwarding table only based on the destination address of at least one of the first and second packets and the controller is to modify the at least one of the plurality of entries only based on the source address of at least one of the first and second packets.

3. The local switch of claim 1, wherein the controller is to add a value to the location field of a first entry of the plurality of entries based on the location value of the first packet, if the source address of the first packet matches a value of the destination field of the first entry and the value at the location field of the first entry does not match the location value of the first packet.

4. The local switch of claim 3, wherein the location field indicates at least one of a port number of the local switch, a MAC address of a remote switch, and an IP address of the remote switch.

5. The local switch of claim 4, wherein,
the controller further adds the value by replacing the value of the location field of the first entry with a MAC address included in the location value of the first packet, if the location field indicates the MAC address of the remote switch, and
the controller further adds the value by replacing the value of the location field of the first entry with a port number of the local switch at which the first packet was received, if the location field indicates the port number of the local switch.

6. The local switch of claim 4, wherein,
the controller is to output the second packet to one of a plurality of ports of the local switch, if one of the plurality of entries of the forwarding table includes a destination field having the destination address of the second packet and the location field having the port number that matches one of the plurality of ports of the local switch, and
the network controller is to output the second packet to the remote switch, if one of the plurality of entries of the forwarding table includes a destination field having the destination address of the second packet and the location field having the MAC address that matches the remote switch.

7. The local switch of claim 4, wherein,
the local switch is associated with a local device and the remote switch is associated with a remote device, and
the local device is to transmit the second packet to the remote switch via the local switch and the remote device is to transmit the first packet to the local switch via the remote switch.

8. The local switch of claim 7, wherein,
the location value of the first packet relates to a MAC address of the remote switch, and
the destination address of the second packet and source address of the first packet relates to a location of the remote device.

9. A method, comprising:
receiving a first packet, at a switch, the first packet including a source address and a location value indicating at least part of a route along a network to the source address;
determining, at the switch, that destination fields in a forwarding table include the source address of the first packet, wherein the forwarding table includes a plurality of entries, each entry having a destination field and a location field;
determining that the location value is not yet associated with the source address in the forwarding table;
adding the location value to the forwarding table responsive to determinations that the source address is included in the destination fields of the forwarding table and the location value is not yet associated with the source address in the forwarding table;
not adding the location value to the forwarding table if the source address is not included in the destination fields of the forwarding table;
receiving a second packet, at the switch, the second packet including a destination address, the first packet received from a remote device and the second packet received from a local device;
determining, at the switch, that none of the destination fields of the forwarding table includes the destination address; and
adding a new entry to the plurality of entries of the forwarding table responsive to a determination that none of the destination fields of the forwarding table includes the destination address, a destination field of the new entry to include the destination address of the second packet and a location field of the new entry to remain unknown.

10. The method of claim 9, wherein
the adding adds the location value to the location field associated with the destination field including the source address.

11. The method of claim 9, wherein the location value of the first packet indicates a media access control (MAC)

address of a remote switch included in the route along the network to the source address.

12. A non-transitory computer-readable storage medium storing instructions that, if executed by a processor of a network switch, cause the processor to:
   store, at a forwarding table of the network switch, destination addresses of a plurality of remote devices, the destination addresses extracted from packets received from a local device coupled to the network switch;
   receive a first packet from one of the plurality remote devices, the first packet to include a source address and a location value indicating at least part of a route along a network to the source address;
   compare the source address of the first packet to the destination addresses of the forwarding table;
   at least one of discard and forward the first packet without modifying the forwarding table, if none of destination addresses match the source address;
   receive a second packet including a destination address; and
   add a new entry to the forwarding table if the destination address of the second packet is not included in any of the destination fields of the forwarding table, wherein the destination field of the new entry is to include the destination address of the second packet and the location field of the new entry is to remain unknown.

13. The non-transitory computer-readable storage medium of claim 12, further comprising instructions that, if executed by the processor of the network switch, cause the processor to:
   add the location value of the first packet to the forwarding table if one of the destination addresses matches the source address and the matching destination address is not yet associated with the location value.

14. The non-transitory computer-readable storage medium of claim 13, wherein the location value of the first packet indicates a media access control (MAC) address of a remote switch included in the route along the network to the source address.

15. The non-transitory computer-readable storage medium of claim 13, wherein the location value of the first packet indicates a port number of the network switch at which the first packet is received from the one of the plurality remote devices.

16. The non-transitory computer-readable storage medium of claim 13, wherein the location value of the first packet indicates an Internet Protocol (IP) address of a remote switch included in the route along the network to the source address.

17. The non-transitory computer-readable storage medium of claim 13, wherein the location value of the first packet indicates a port number of the switch at which the first packet is received.

* * * * *